US009099031B2

(12) United States Patent
Chen et al.

(10) Patent No.: US 9,099,031 B2
(45) Date of Patent: Aug. 4, 2015

(54) LAYOUT SYNCHRONIZATION

(75) Inventors: Ben Chen, Santa Clara, CA (US); Ryan Christopher Griggs, San Jose, CA (US); Yifeng Gui, Santa Clara, CA (US); Jonathan Sigler, San Jose, CA (US); Kevin Iversen Smith, San Jose, CA (US)

(73) Assignee: Apple Inc., Cupertino, CA (US)

( * ) Notice: Subject to any disclaimer, the term of this patent is extended or adjusted under 35 U.S.C. 154(b) by 497 days.

(21) Appl. No.: 13/525,003

(22) Filed: Jun. 15, 2012

(65) Prior Publication Data
US 2013/0339833 A1 Dec. 19, 2013

(51) Int. Cl.
G06F 17/00 (2006.01)
G09G 5/22 (2006.01)
G06F 17/21 (2006.01)
G06F 3/14 (2006.01)

(52) U.S. Cl.
CPC .............. G09G 5/227 (2013.01); G06F 3/1454 (2013.01); G06F 17/211 (2013.01); G09G 2340/14 (2013.01); G09G 2360/02 (2013.01); G09G 2360/04 (2013.01); G09G 2370/022 (2013.01)

(58) Field of Classification Search
CPC .................................................... G06F 17/211
USPC ......... 715/203, 204, 212, 217, 220, 235, 238, 715/243, 248, 249, 250, 788, 864
See application file for complete search history.

(56) References Cited

U.S. PATENT DOCUMENTS

| | | | | |
|---|---|---|---|---|
| 5,802,531 A * | 9/1998 | Lamiraux et al. | ............. | 715/202 |
| 5,867,156 A * | 2/1999 | Beard et al. | .................... | 715/753 |
| 5,926,816 A * | 7/1999 | Bauer et al. | ............................ | 1/1 |
| 5,956,738 A * | 9/1999 | Shirakawa | ..................... | 715/273 |
| 6,023,714 A * | 2/2000 | Hill et al. | ....................... | 715/235 |
| 6,295,541 B1* | 9/2001 | Bodnar et al. | ......................... | 1/1 |
| 6,802,058 B2* | 10/2004 | Banavar et al. | ................ | 717/138 |
| 7,287,220 B2* | 10/2007 | Kaasila et al. | ................. | 715/201 |
| 7,756,824 B2* | 7/2010 | Campbell et al. | ............. | 707/610 |
| 8,225,191 B1* | 7/2012 | Kalman | ........................ | 715/203 |
| 8,307,119 B2* | 11/2012 | Rochelle et al. | .............. | 709/248 |
| 8,547,588 B2* | 10/2013 | Giannetti et al. | ............. | 358/1.18 |
| 2003/0219263 A1* | 11/2003 | Tsuzuki | ........................... | 399/27 |
| 2004/0024795 A1* | 2/2004 | Hind et al. | ..................... | 707/204 |
| 2004/0088653 A1* | 5/2004 | Bell et al. | ....................... | 715/523 |
| 2004/0216043 A1* | 10/2004 | Roudot | ......................... | 715/517 |
| 2005/0060648 A1* | 3/2005 | Fennelly et al. | .............. | 715/523 |
| 2005/0195221 A1* | 9/2005 | Berger et al. | .................. | 345/660 |
| 2005/0203905 A1* | 9/2005 | Jung et al. | ........................ | 707/8 |
| 2006/0200755 A1* | 9/2006 | Melmon et al. | ................ | 715/511 |
| 2006/0277497 A1* | 12/2006 | Minagawa et al. | ........... | 715/819 |

(Continued)

FOREIGN PATENT DOCUMENTS

WO  2008031070 A3  3/2008

*Primary Examiner* — Stephen Hong
*Assistant Examiner* — Gregory J Vaughn
(74) *Attorney, Agent, or Firm* — Fish & Richardson P.C.

(57) ABSTRACT

Methods, program products, and systems for layout synchronization are described. A first device can share with a second device a layout designed according to display properties of the first device, even if display properties of the second device differ from those of the first device. The layout can be synchronized between the devices, where each device can adapt the layout in a manner specific to the display properties of the device. Two-dimensional views of same data can have a consistent appearance on multiple devices each having distinct display properties.

27 Claims, 9 Drawing Sheets

(56) References Cited

U.S. PATENT DOCUMENTS

| | | |
|---|---|---|
| 2007/0208996 A1* | 9/2007 | Berkner et al. ............... 715/521 |
| 2009/0293003 A1* | 11/2009 | Nykamp ....................... 715/755 |
| 2010/0023855 A1* | 1/2010 | Hedbor et al. ................ 715/234 |
| 2011/0095966 A1 | 4/2011 | Shinotou |
| 2011/0286043 A1* | 11/2011 | Hagisawa et al. ............ 358/1.15 |
| 2012/0001832 A1 | 1/2012 | Braghis et al. |
| 2012/0081354 A1* | 4/2012 | Yusupov et al. .............. 345/418 |
| 2012/0096394 A1* | 4/2012 | Balko et al. ................... 715/790 |
| 2012/0198317 A1* | 8/2012 | Eppolito et al. .............. 715/202 |

* cited by examiner

LAYOUT SYNCHRONIZATION

TECHNICAL FIELD

This disclosure relates generally to database applications.

BACKGROUND

Many modern database tools integrate a database engine with a graphical user interface (GUI). The content of the database can be formatted and displayed in the GUI according to a layout, which can include data formatting information. A user may wish to access data stored in a database from multiple devices each having different display properties. In a conventional database application program, the user can define a layout on a first device, and copy the layout to a second device. Due to the different display properties between the first and second devices, even when data were formatted correctly on the first device using the layout, the data may be formatted incorrectly on the second device if the same layout is used. Alternatively, the user can define a first layout on the first device, and a second layout on the second device. This approach may be unscalable.

SUMMARY

Methods, program products, and systems for layout synchronization are described. A first device can share with a second device a layout designed according to display properties of the first device, even if display properties of the second device differ from those of the first device. The layout can be synchronized between the devices, where each device can adapt the layout in a manner specific to the display properties of the device. Two-dimensional views of same data can have a consistent appearance on multiple devices each having distinct display properties.

A first device can receive a synchronization request requesting that a local layout of the first device be synchronized with a remote layout of a second device. Each layout can define a formatted view of data. The formatted views, when the local layout and remote layout are synchronized, can have a consistent appearance. Each layout can include a list of cells. Each cell can be associated with a data field and a location hint for displaying the data field at a location relative to another data field. The first device can determine a difference between a property of a display device of the first device and a property of a display device of the second device. The first device can determine a local cell in the local layout that corresponds to an updated remote cell in the remote layout. The first device can update, based on the difference between properties of display devices and the updated remote cell, the local cell determined as corresponding to the updated remote cell, such that the difference between the properties of the display devices is compensated to maintain the consistent appearance.

Layout synchronization can be implemented to achieve the following advantages. The techniques can allow a user to create a layout on one device, where the layout can be applied to another device without user modification. The techniques can allow a user to edit a layout on multiple devices, and, through synchronization, merge changes made in different display areas into a layout having a uniform appearance. Unlike conventional content merging applications, which can merge linear changes made by different content editors, layout synchronization can merge changes made in a two-dimensional space on "look and feel" of data, rather the data themselves.

The details of one or more implementations of layout synchronization are set forth in the accompanying drawings and the description below. Other features, aspects, and advantages of layout synchronization will become apparent from the description, the drawings, and the claims.

BRIEF DESCRIPTION OF THE DRAWINGS

Like reference symbols in the various drawings indicate like elements.

DETAILED DESCRIPTION

Overview

Figure 1:
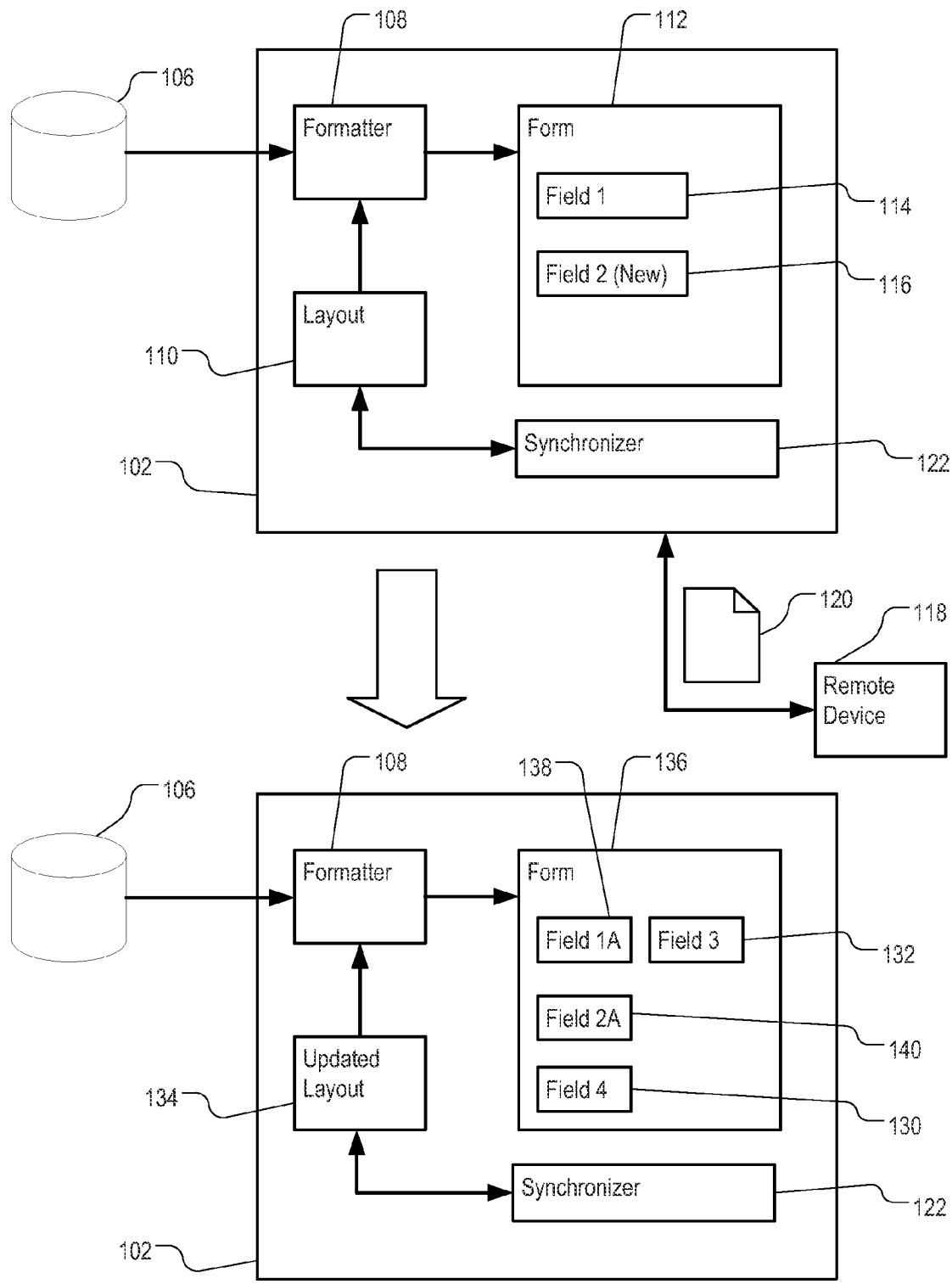
FIG. 1 is a block diagram providing an overview of exemplary layout synchronization techniques.

FIG. 1 is a block diagram providing an overview of exemplary layout synchronization techniques. A layout on device 102 is being synchronized with a layout on another device. Device 102 can be a computer, e.g., a tablet computer, configured to execute an application program for accessing database 106. The application program can retrieve data from database 106. The application program can include formatter 108, which is configured to format the retrieved data using layout 110. Layout 110 can represent ways the retrieved data are organized and presented for browsing, preview, or printing. Layout 110 can include cells and formatting properties of each cell. The cells can correspond to data fields, objects, pictures, and layout parts including, for example, body, header, footer, summary. Additional details on the cells and how cells are organized in a layout will be described below in further detail in reference to FIGS. 2A and 2B. Layout 110 can be edited by a user of device 102.

Formatter 108 of device 102 can generate exemplary formatted view 112 using the retrieved data and layout 110. For illustrative purposes, formatted view 112 is a form, which is configured to display data records in the retrieved data one record at a time. In various implementations, formatted view 112 can be a table configured to display multiple data records at once, or another view structure.

Formatted view 112 can include two exemplary form cells, cell 114 and cell 116. Cell 114 and cell 116 can each correspond to a data field in a data record in the retrieved data. Cell 116 can correspond to a cell added by a user to layout 110.

Before cell 116 was added to layout 110, device 102 shared layout 110 with remote device 118.

Remote device 118 can be another computer, e.g., a desktop computer, configured to execute an application program for accessing database 106. On remote device 118, the shared layout can be edited independently from the editing of layout 110 on device 102. Upon a synchronization request made by either device 102 or remote device 118, change log 120 can be passed between device 102 and remote device 118. Change log 120 can include information on changes made on each device. In the example shown, change log 120 can include information on update of the shared layout performed by remote device 118.

Device 102 can include synchronizer 122, which can be a hardware or software component configured to analyze change log 120, determine if changes to a layout are made by remote device 118, and merge the changes, if any, with changes made locally to layout 110. Synchronizer 122 can compare change log 120 and layout 110 to determine if any conflict exists, and resolve the conflict according to a set of conflict resolution rules. In addition, if device 102 and remote device 118 have different display properties, synchronizer 122 can adjust the changes to compensate for the difference in display properties.

For example, synchronizer 122 can determine that, based on layout 110 and change log 120, that remote device 118 has added cell 130 to an original column of a form, and cell 132 in a new column. In addition, synchronizer 122 can determine that remote device 118 has reduced column width for each column. Accordingly, synchronizer 122 can reduce the column width for each column such that the column width for a form on device 102 is the same as a column width for a corresponding form on remote device 118.

Synchronizer 122 can generate updated layout 134. Device 102 can then generate synchronized form 136 based on updated layout 134. Synchronized form 136 can have two columns. An original column can include original cell 138, cell 140, which corresponds to cell 116 as added by device 102, and cell 130, which was added by remote device 118. A new column can include cell 132, as added by remote device 118. Each of the columns can have a reduced width. Although remote device 118 did not change cell 140, synchronizer 122 can modify cell 140 to accommodate the now narrower width of the column. After synchronization, a layout on remote device 118 can be updated. The updated layout on remote device 118 can be usable to generate a form that has an appearance that corresponds to synchronized form 136.

Exemplary Cells

Figure 2A:
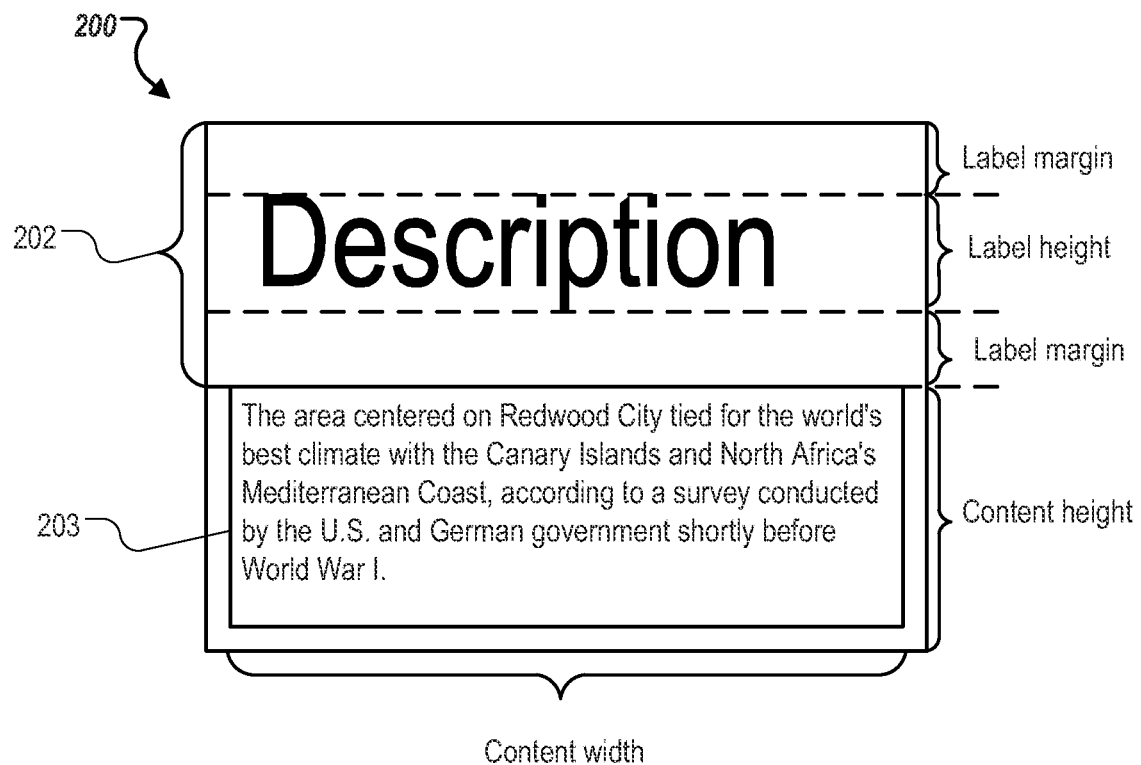
FIG. 2A is an illustration of an exemplary cell as defined in a layout.

FIG. 2A is an illustration of exemplary cell 200 as defined in a layout. The layout can be layout 110 or layout 134 of FIG. 1. The layout can be a list of cells representing a formatted view on a two-dimensional display device. The formatted view can be a form that includes one or more form cells.

Cell 200 in the layout can represent a form cell in a form displayed on a screen. The form cell can correspond to a data field in a data record. Cell 200 can store formatting information on how to display the data field in the form cell. The formatting information can include sizing and style information of the form cell. In various implementations, cell 200 may or may not store absolute screen position of the form cell. Cell 200 can be associated with a location hint on where the form cell is to be placed. The location hint will be described in further details below Cell 200 can include label area 202 and content area 203. Label area 202 can be on top of content area 203. Label area 202 can have properties of label margin and label height. Content area 203 can have properties of content height and content width. In some implementations, height and width of label area 202 are calculated at rendering time, rather than stored in the layout. Label area 202 can be calculated as a function of a width as content area 203. Height of label area 202 can be calculated based on label font size and a label height rule. The label height rule can specify, for example, that label area 202 shall be tall enough to accommodate a single line of text for a selected label font. Cell 200 can have styling attributes including, for example, content font size, shading option, etc. A layout can have global attributes, e.g., label font size, that are applicable to each cell including cell 200.

Cell 200 can be associated with a cell identifier, a data field identifier identifying an underlying data field, a display order specifying when cell 200 is rendered relative to other cells, and a flow direction. The flow direction can be a value indicating whether cell 200 is at a beginning of a new column, a beginning of a new row, or neither. The flow direction is usable to construct a two-dimensional form out of the layout, which can be a one-dimensional data structure.

When an absolute position of a form cell on a form is not stored, the absolute position can be determined at rendering time based on how many cells have been laid out before cell 200 according to the display order of cell 200, and how tall and wide those cells are. The size of cell 200, the display order, and flow direction each can be part of a location hint of cell 200. Cell 200 can cause a form cell be placed in a form at a location determined by the location hint.

Figure 2B:
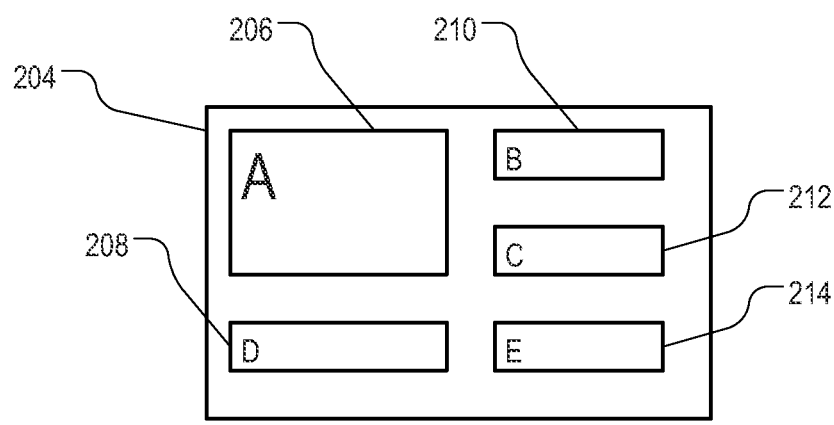
FIG. 2B is an illustration of data formatted according to an exemplary layout including multiple cells.

FIG. 2B is an illustration of data formatted according to an exemplary layout including multiple cells. The layout can be layout 110 or layout 134 of FIG. 1.

A formatter (e.g., formatter 108) of FIG. 1 can include a layout engine. The layout engine can be configured to format the data using the layout to generate exemplary form 204. The layout engine can load all cells of the layout. The layout engine can sort the loaded cells using the display order property of each cell. The layout engine can read the sorted cells one by one, uses each cell's flow direction to determine if a new column or new row needs to be created. The layout engine can then add the cell to a last row of the last column created. The layout engine can generate the layout using the following exemplary procedure.

CellArray=[form loadAllCells];
    [CellArray sortByOrder]
    CurrentColumn=nil
    CurrentRow=nil
    for every Cell in CellArray
    if (Cell.flowDirection==NewColumn)
       CurrentColumn=[Column new]
       CurrentRow=[Row new]
       [CurrentColumn addChild:CurrentRow]
    else if (Cell.flowDirection==NewRow)
       CurrentRow=[Row new]
    [CurrentColumn addChild:CurrentRow]

List 1: Exemplary Procedure for Generating Two-Dimensional Form from Layout

In the example shown, cells 206, 208, 210, 212, and 214 can be associated with values as illustrated in Table 1 below.

TABLE 1

Exemplary Layout

| Cell ID | Order | Flow Direction |
|---|---|---|
| 206 | 1 | NewColumn; NewRow |
| 208 | 2 | NewRow |
| 210 | 3 | NewColumn; NewRow |
| 212 | 4 | NewRow |
| 214 | 5 | NewRow |

The spacing between cells 206, 208, 210, 212, and 214 are for clarity of illustration. In various implementations, the spacing between cells can be zero or a non-zero value. The location of each of cells 206, 208, 210, 212, and 214 in form 204 can be determined based on height and width of each cell.

Figure 3:
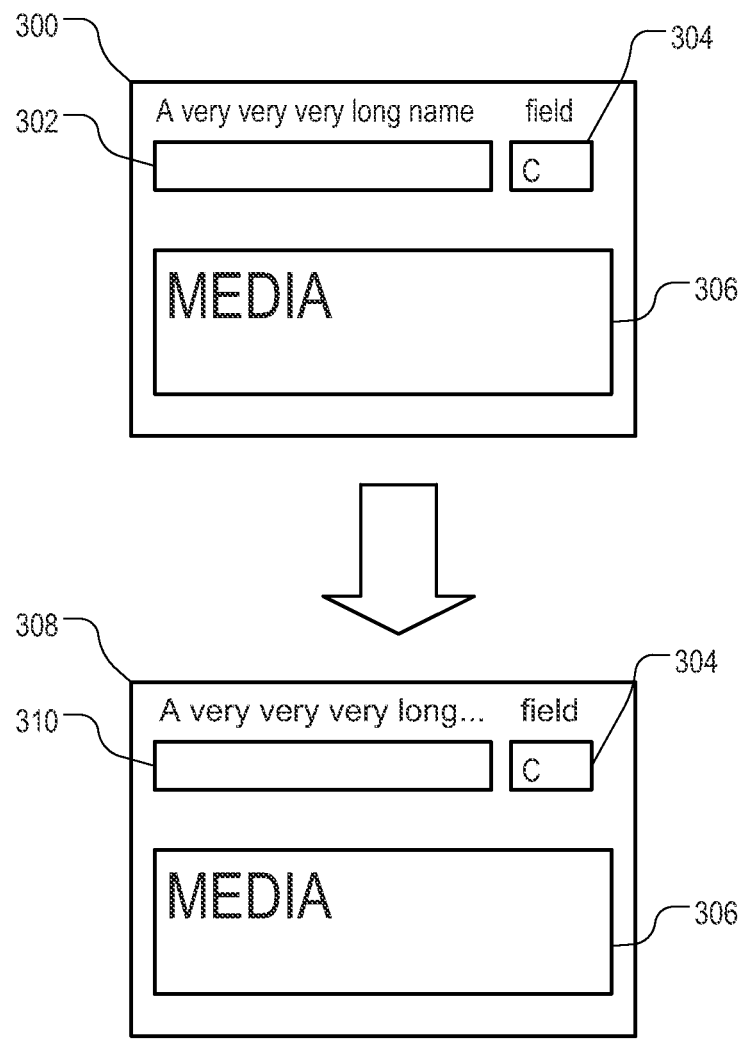
FIG. 3 is an illustration of exemplary compensation for display devices having different display properties to generate a consistent appearance.

FIG. 3 is an illustration of exemplary compensation for display devices having different display properties to generate a consistent appearance. When two devices (e.g., device 102 and remote device 118 of FIG. 1) have different properties, components of the layout can be automatically adjusted such that forms displayed on the two devices have consistent appearances.

Form 300 can be a form displayed on a first device (e.g., device 102 of FIG. 1). The first device can have a display property indicating a default font for form 300. The first device can also have a formatting rule specifying that cell label truncation is prohibited. In the example shown, cell 302 and cell 304 are aligned horizontally, where cell 302 is positioned to the left of cell 304. Cell 302 has a long label "A very very very long name." According to the formatting rule, the label is not truncated. A formatter can, at rendering time, determining the width of cell 302 such that the width cell 302 is sufficient to accommodate all characters in the label. Cell 302 and cell 304 are aligned with cell 306, where the left edge of cell 302 is in line with the left edge of cell 306, and the right edge of cell 304 is in line with the right edge of cell 306.

The layout for form 300 can be synchronized with a layout on a second device to generate updated layout that corresponds to form 308. The second device can have different display properties for the first device. For example, the second device can have a display property specifying a default font that is wider than the default font of the first device. Accordingly, a cell having the entire text of the label will be wider than cell 302. Cells 302 and 304 therefore may not be aligned with cell 306, if width of cell does not change. A synchronizer (e.g., synchronizer 122 of FIG. 1) can determine modifications of formatting rules. For example, the synchronizer can specify that, on the second device, a display rule specifying that cell label truncation is prohibited is inapplicable if the rule is in conflict with the display property. The synchronizer can generate cell 310, which can have truncated label "A very very very long . . . " The synchronizer can determine the amount of truncation such that originally aligned cells are still aligned after synchronization.

In addition, a label or a data field value displayed in a cell can have a different height on each device. If a label in a font on a first device is different in height from the label in a font on a second device, display margin of the label area (as illustrated in FIG. 2A) can be adjusted to accommodate the difference. If a dimension of the data field value, e.g., content displayed in a content area of cell 306 on one device is different from a dimension of the same data field value on another device, a synchronizer can apply the same truncation rule change as described above in reference to cell 310 to compensate.

Exemplary Synchronization Processes

Figure 4:
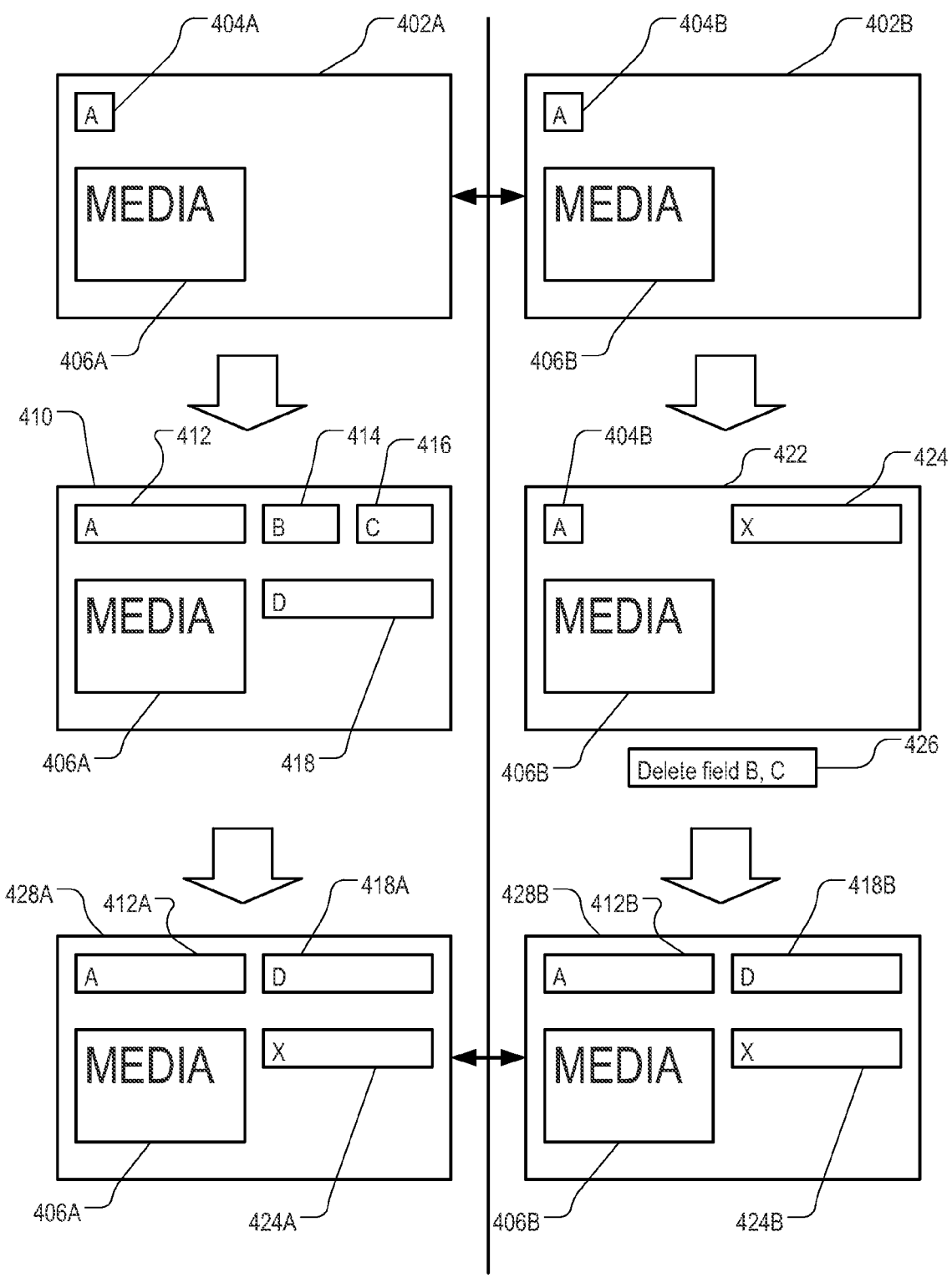
FIG. 4 is an illustration of synchronizing exemplary layouts independently updated on two devices.

FIG. 4 is an illustration of synchronizing exemplary layouts independently updated on two devices. The two devices can be device 102 and remote device 118 of FIG. 1.

Original form 402A can be created on a first device. Original form 402A can include form cell 404A and form cell 406A. Form cell 404A and form cell 406A can be stored as cells in a layout. Each of form cell 404A and form cell 406A can correspond to a data field of a database. Form cell 404A can correspond to data field "A." Form cell 406A can correspond to data field "Media." Through a first synchronization, when no layout corresponding to the database exists on the second device, the layout of original form 402A can be copied to the second device.

A synchronizer (e.g., synchronizer 122 of FIG. 1) of the second device can automatically modify attributes of form 402A to generate form 402B. For example, the synchronizer can modify attributes of form cell 404A and form cell 406A as represented in the layout to generate modified form cell 404B and modified form cell 406B, in form 402B to compensate for differences, if any, between display devices of first device and second device.

After the first synchronization, layout on each of the first device and the second device can be modified independently. For example, on the first device, original form 402A is modified into updated form 410. In updated form 410, a width of form cell 404A has been increased. Updated cell 412 can correspond to form cell 404A and have a greater width than form cell 404A has. New cells 414, 416, and 418 have been added. New cells 414, 416, and 418 can correspond to data fields B, C, and D, respectively.

On the second device, original form 402A is modified into updated form 422. In updated form 422, new form cell 424 can be added. Form cell 424 can be added to a new column, and correspond to data field X. Form cell 424 can include a special text box having embedded content (e.g., a constant text string). In addition, the second device can receive request 426 for deleting data fields B and C.

After the independent updates, a second synchronization of layouts can be performed. Upon synchronization, the first device and the second device can generate forms 428A and 428B, respectively. Forms 428A and 428B can have consistent appearances. Form cell 412A, which corresponds to form cell 412 as modified on the first device, can appear on form 428B as form cell 412B. Data fields B and C underlying form cells 414 and 416 have been deleted; accordingly, form cells 414 and 416 can be removed from form 428A. The flow direction of form cell 414 can be preserved. Accordingly, form cell 418, as created on the first device, is shown as form cell 418A, which carries the same flow direction as form cell 414. Form cell 424, as created on the second device, can be appended to the end of a last column as form cell 424A in form 428A. Form cells 412B, 418B, and 424B in form 428B can correspond to form cells 412A, 418A, and 424A of form 428A. The two-dimensional formatting characteristics of forms 428A and 428B can be stored in a layout having linear data structure on each of the first and second devices, respectively.

Figure 5:
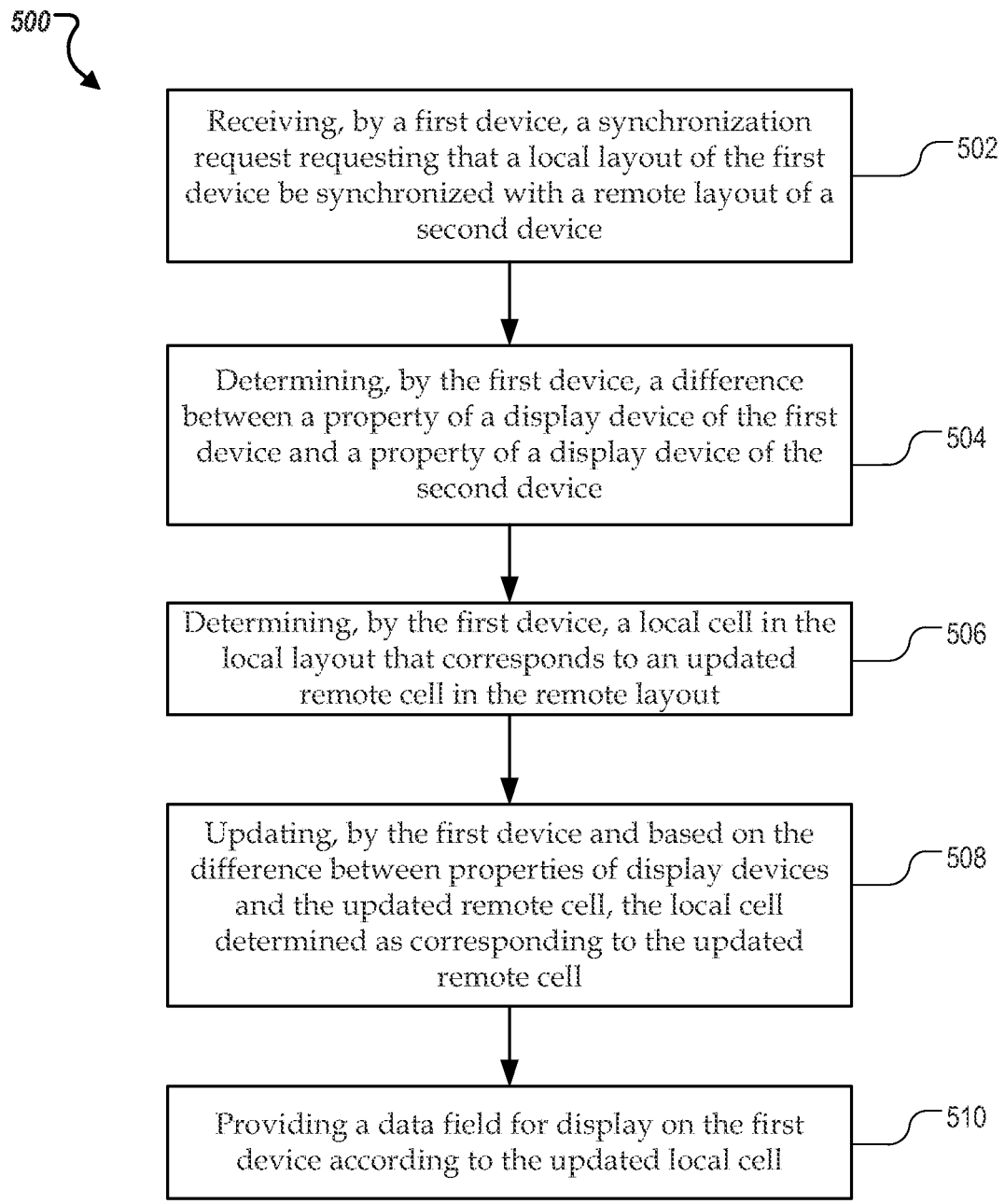
FIG. 5 is a flowchart of an exemplary process of layout synchronization.

FIG. 5 is a flowchart of exemplary process 500 of layout synchronization. A first device, e.g., a mobile computing device or a desktop computer, can receive (502) a synchronization request requesting that a local layout of the first device be synchronized with a remote layout of a second device. The synchronization request can be received from a user of the first device, or from the second device. The local layout and the remote layout each can define a formatted view of data, e.g., a form or a table. The formatted views as defined by the layouts, when the local layout and remote layout are synchronized, can have a consistent appearance. Each layout can include a list of cells. Each cell can be associated with a data field. Each cell in the layout can have a location hint for displaying content of the data field at a screen location relative to a location of another data field. The location hint can include a size of the cell when displayed, a display order of the cell, and a flow direction indicating the cell. The flow direction can indicate that the cell, when displayed, is located a beginning of a new row, a beginning of a new column, or neither a beginning of a new row nor a beginning of a new column.

The first device can determine (504), a difference between a property of a display device of the first device and a property of a display device of the second device. The difference between properties of the display devices can include at least one of a difference in screen dimensions, a difference in display themes, a difference in minimum, default font display sizes, a difference in pixel density or a difference in pixel count.

The first device can determine (506) a local cell in the local layout that corresponds to an updated remote cell in the remote layout. Determining a local cell that corresponds to an updated remote cell can include identifying the local cell from one or more local cells. Identifying the local cell can be based on a match between a cell identifier of the local cell and a cell identifier of the remote cell, a field identifier of a field underlying the local cell and the remote cell, or a match between a location hint corresponding to the local cell and a location hint corresponding to the updated remote cell.

In some implementations, identifying the local cell can include determining that a perfect match between a local cell and the remote cell does not exist. The first device can then create a new local cell, including designating for the new local cell a location hint indicating that the new cell, when displayed, is located at a beginning of a new row and in a last column. The new local cell can be assigned to an underlying data field that is the same as the underlying data field of the remote cell. The first device can designate the new local cell as the local cell that corresponds to the updated remote cell.

In some implementations, identifying the local cell can include determining that a remote display order has been updated for the remote cell at the second device. The first device can determine that a conflict exists, where a display order of the local cell that corresponds to the remote cell has been updated differently. The first device and the second device can jointly resolve the conflict according to the display order of the local cell.

Jointly resolving the conflict can include performing the following operations. The first device can generate a snapshot of the local layout. The snapshot can include a dictionary for each cell in the local layout. The dictionary for a cell can include the cell's display order, flow direction, cell identifier, and a field identifier for identifying an underlying data field of the cell. The first device can send the snapshot to the second device in association with a resolution request for the second device to update the remote layout according to the snapshot such that the updated remote cell is further updated according to the display order of the local cell.

The second device, upon receiving the snapshot and the conflict resolution request, can loop through the snapshot. For each dictionary in the snapshot, the second device can determine if a remote cell on the second device having the same cell identifier in the dictionary exists.

If a remote cell on the second device having the same cell identifier as the cell identifier in the dictionary does not exist, the second device can determine if a data field having the field identifier in the dictionary exists. If the data field exists, the second device can create a new cell for the data field. If the data field does not exist, the missing cell's flow direction can be carried over, i.e., if the missing cell is at the beginning of a new column or a new row, a next available cell will be placed at the new column or new row such that the appearance of data fields, when formatted, will be preserved.

If a remote cell on the second device having the same cell identifier as that in the dictionary does exist, or has been created based on an underlying data field, the second device can apply properties in the dictionary to the cell, including setting the display order and flow direction according to those fields in the dictionary.

If the second device determines, based on the snapshot, that there are cells in the snapshot but not in the remote layout on the second device, the second device can determine if these cells can be removed without data loss. A removal of a cell may cause data loss if the cell includes embedded text (e.g., form cell 424 of FIG. 4). If these cells can be removed without data loss, the second device can remove them; otherwise, the second device can append these cells at the end of the last column.

The first device can update (508), based on the difference between properties of display devices and based on the updated remote cell, the local cell determined as corresponding to the updated remote cell, such that the difference between the properties of the display devices is compensated to maintain the consistent appearance. Updating the local cell can include merging a local change and a remote change. In some implementations, updating the local cell comprises providing a local user input mechanism for the local cell, the local user input mechanism being different from a user input mechanism associated with the corresponding remote cell. For example, when a display screen of the first device is a touch-sensitive screen where a display screen of the second device is not a touch-sensitive screen, the first device can associate various touch input to the local cell. For example, the first device can associate a single tap, double tap, or tap and hold to the local cell for editing, toggling, or highlighting the local cell.

The first device can provide (510) a data field for display on the local device according to the updated local cell.

Figure 6:
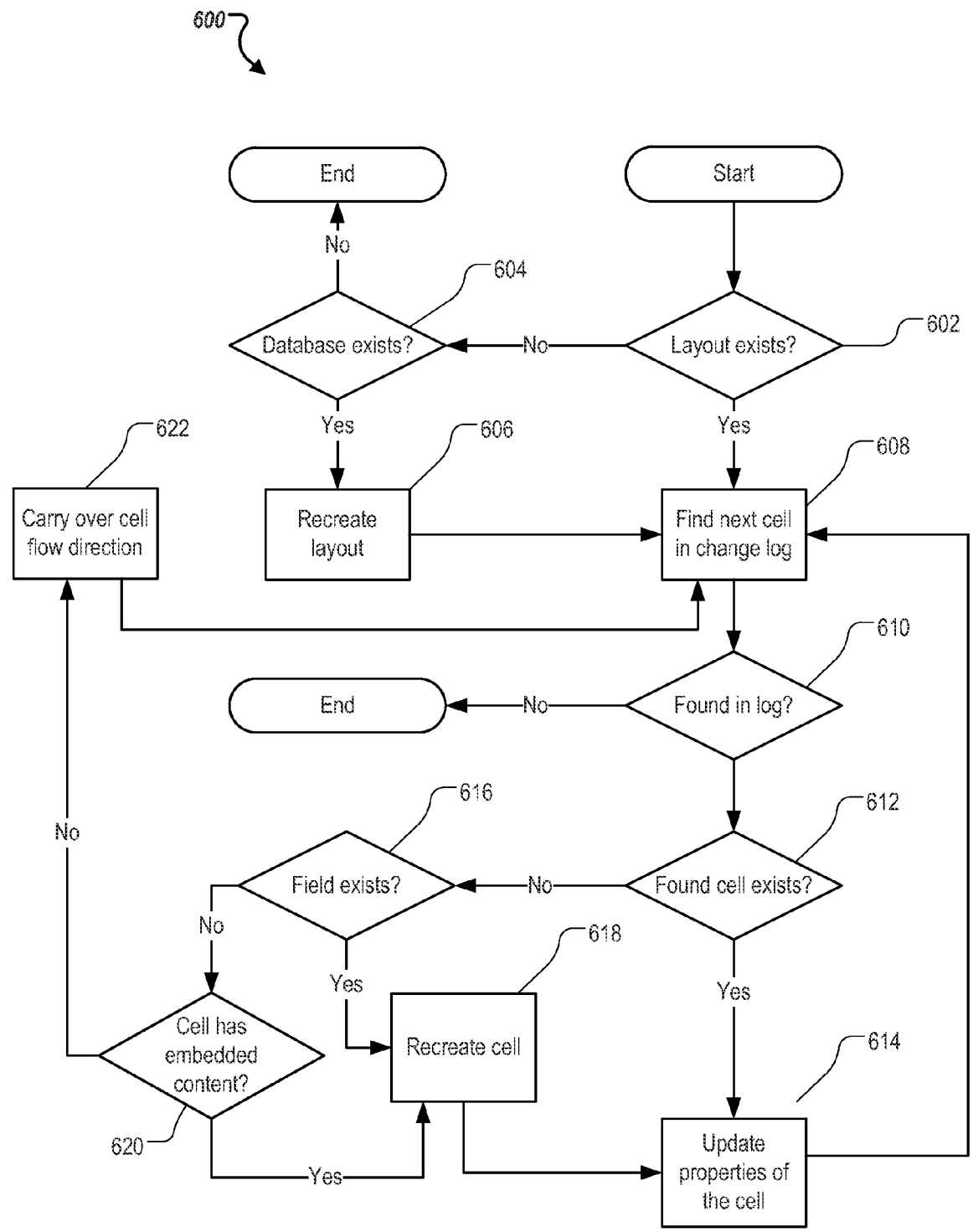
FIG. 6 is a flowchart illustrating an exemplary process of updating a layout being synchronized.

FIG. 6 is a flowchart illustrating exemplary process 600 of updating a layout being synchronized. Process 600 can be performed by a synchronizer, e.g., synchronizer 122 of FIG. 1. The synchronizer on a device, e.g., device 102, can find a layout to be synchronized, update the layout and cells in the layout, using values from a change log (e.g., change log 120 of FIG. 1). Process 600 can be performed after underlying database and data fields have already been synchronized.

Upon receiving a change log, the synchronizer can determine (602) whether a layout specified as changed in the change log exists on a local device. If the layout does not exist, the synchronizer can determine (604) whether a database underlying the layout exists. If the database does not exist, the synchronizer can terminate process 600. If the database exists, the synchronizer can recreate (606) the layout based on the database and the change log.

If the layout already exists on the local device, or has been recreated in stage 606, the synchronizer can iterate through the change log on cells. The synchronizer can attempt to find (608) a next cell in the change log. The synchronizer can determine (610) whether the next cell is found. If not, the synchronizer can terminate process 600.

If the next cell is found, the synchronizer can determine (612) if the found cell exists in the local layout. If the found cell does exist in the local layout, the synchronizer can update (614) the cell in the local layout according to the cell in the change log.

If the found cell does not exist in the local layout, the synchronizer can determine (616) if a data field underlying the cell exists in the database. If the underlying data field exists, the system can recreate (618) the missing cell based on the underlying data field, and then update (614) the cell. Upon updating, the synchronizer can repeat the operations of stage 608, until all cells in the change log are processed.

If the underlying data field does not exist, the synchronizer can determine (620) whether the found cell includes embedded content. If the found cell includes embedded content (e.g., text string), the synchronizer can recreate (618) the missing cell based on the embedded content. If the found cell does not include embedded content, the synchronizer can carry over (622) a cell flow direction according to the found cell. For example, if the found cell has a flow direction of [new column; new row], the synchronizer can store the flow direction and compare the flow direction with that of a next found cell. If the flow direction of the next found cell is smaller than the stored flow direction, e.g., the flow direction of the next found cell contains only [new row] or [same row], the synchronizer can change the flow direction of the next found cell to the stored flow direction, e.g., [new column; new row]. By doing this, the synchronizer can maintain most of the layout. The synchronizer can then repeat the operations of stage 608, until all cells in the change log are processed.

Exemplary System Architecture

Figure 7:
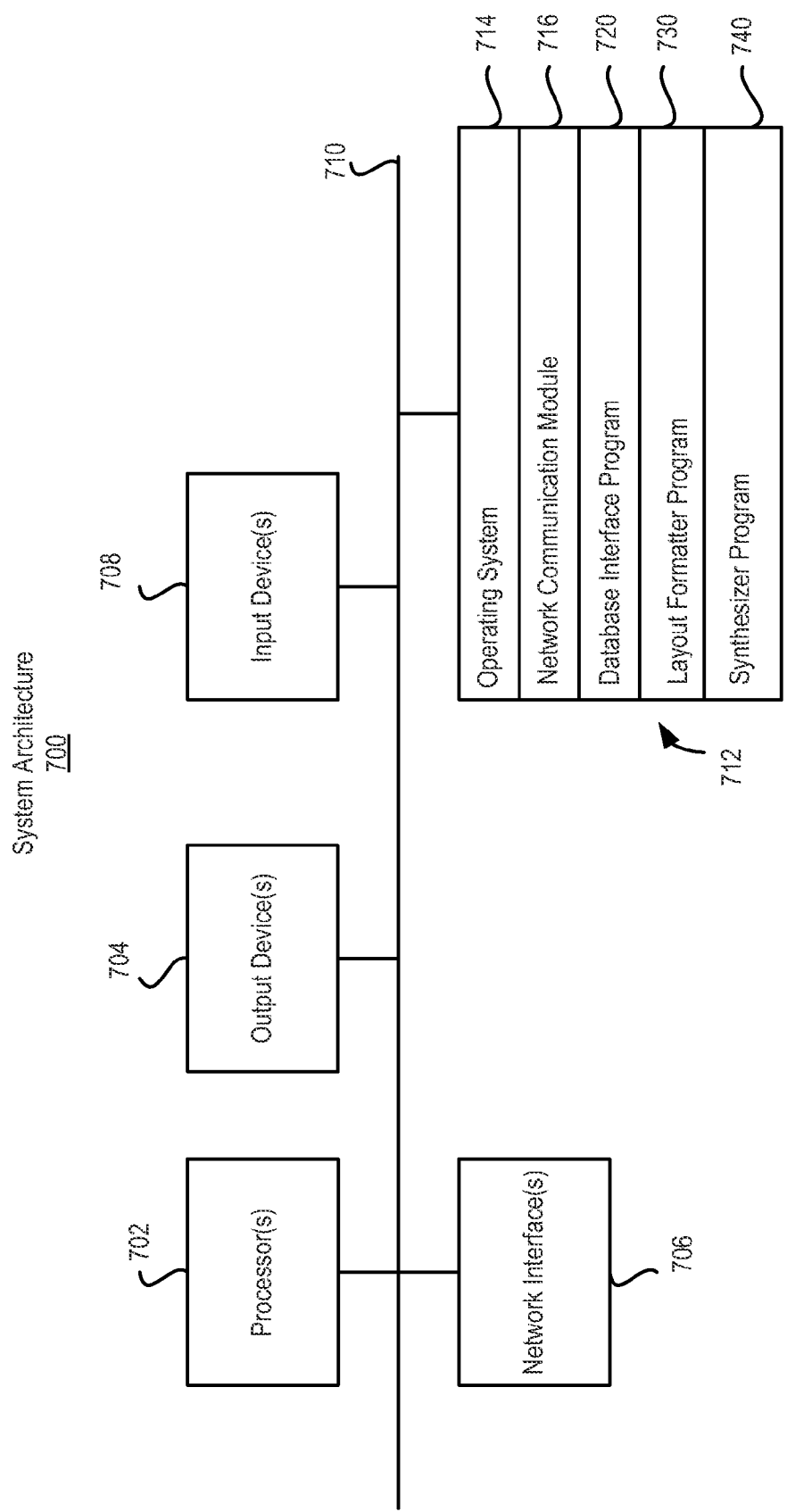
FIG. 7 is a block diagram of an exemplary system architecture for implementing the features and operations of FIGS. 1-6.

FIG. 7 is a block diagram of an exemplary system architecture 700 for implementing the features and operations of FIGS. 1-6. Other architectures are possible, including architectures with more or fewer components. In some implementations, architecture 700 includes one or more processors 702 (e.g., dual-core Intel® Xeon® Processors), one or more output devices 704 (e.g., LCD), one or more network interfaces 706, one or more input devices 708 (e.g., mouse, keyboard, touch-sensitive display) and one or more computer-readable mediums 712 (e.g., RAM, ROM, SDRAM, hard disk, optical disk, flash memory, etc.). These components can exchange communications and data over one or more communication channels 710 (e.g., buses), which can utilize various hardware and software for facilitating the transfer of data and control signals between components.

The term "computer-readable medium" refers to a medium that participates in providing instructions to processor 702 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 712 can further include operating system 714 (e.g., a Linux® operating system), network communication module 716, database interface program 720, layout formatter program 730, and synchronizer program 740. Operating system 714 can be multi-user, multiprocessing, multitasking, multithreading, real time, etc. Operating system 714 performs basic tasks, including but not limited to: recognizing input from and providing output to devices 706, 708; keeping track and managing files and directories on computer-readable mediums 712 (e.g., memory or a storage device); controlling peripheral devices; and managing traffic on the one or more communication channels 710. Network communications module 716 includes various components for establishing and maintaining network connections (e.g., software for implementing communication protocols, such as TCP/IP, HTTP, etc.).

Database interface program 720 can include computer instructions that, when executed, cause processor 702 to perform operations of retrieving data from a database. Database interface program 720 can include interfaces to one or more databases on a file system. The databases can be organized under a hierarchical folder structure, the folders mapping to directories in the file system. Layout formatter program 730 can include computer instructions that, when executed, cause processor 702 to perform operations as described above in reference to formatter 108 of FIG. 1. Synchronizer program 740 can include computer instructions that, when executed, cause processor 702 to perform operations as described above in reference to synchronizer 122 of FIG. 1.

Architecture 700 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor or a retina display device for displaying information to the user, and a touch screen input device or a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Exemplary Operating Environment

Figure 8:
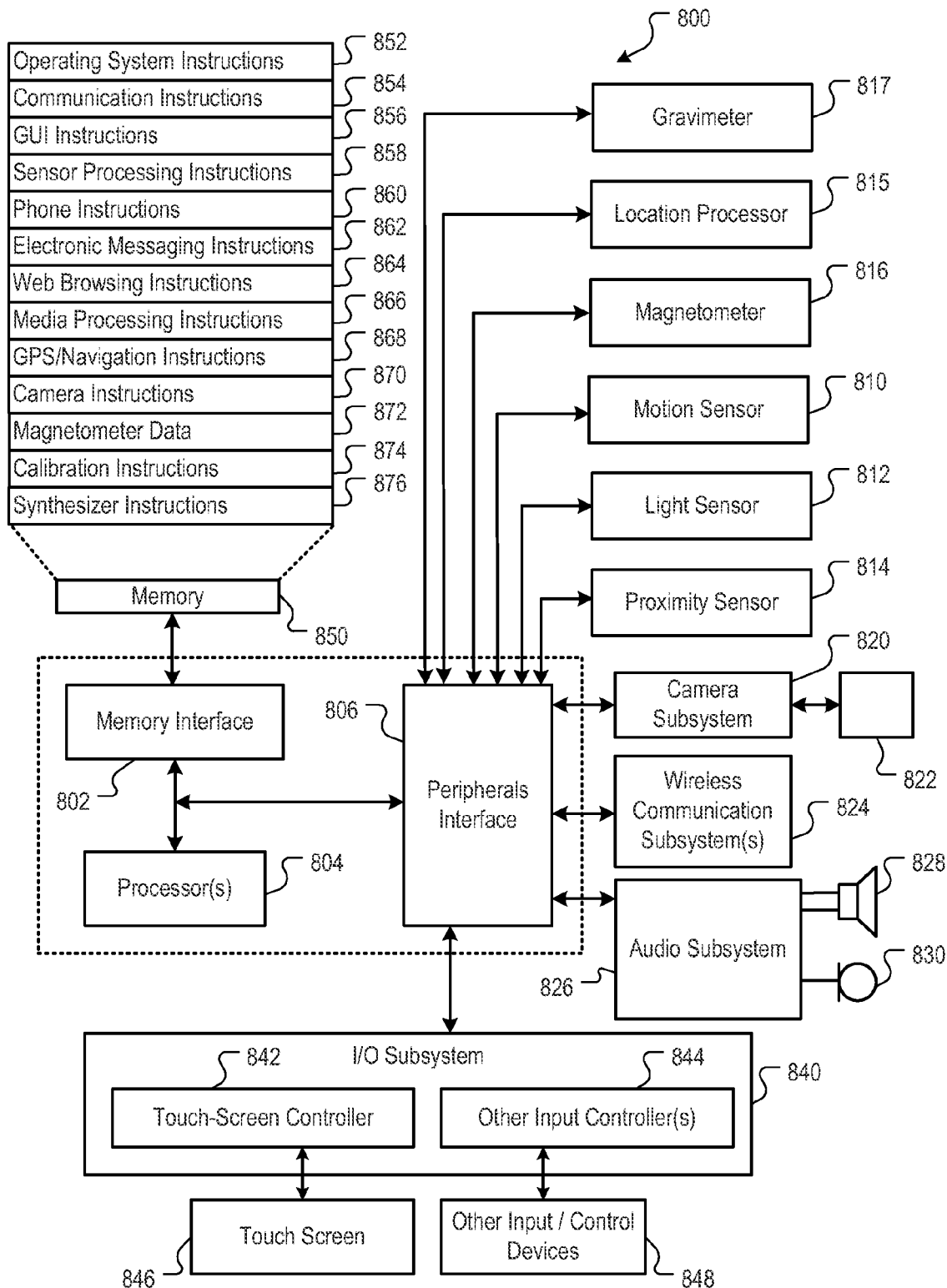
FIG. 8 is a block diagram illustrating an exemplary device architecture of a mobile device implementing the features and operations described in reference to FIGS. 1-6.

FIG. 8 is a block diagram illustrating exemplary device architecture 800 of a mobile device implementing the features and operations described in reference to FIGS. 1-6. The mobile device can be device 102 or device 118 of FIG. 1. The mobile device can include memory interface 802, one or more data processors, image processors and/or processors 804, and peripherals interface 806. Memory interface 802, one or more processors 804 and/or peripherals interface 806 can be separate components or can be integrated in one or more integrated circuits. Processors 804 can include one or more application processors (APs), one or more baseband processors (BPs), and/or one or more wireless processors. The application processors and baseband processors can be integrated in one single process chip. The various components in the mobile device, for example, can be coupled by one or more communication buses or signal lines.

Sensors, devices, and subsystems can be coupled to peripherals interface 806 to facilitate multiple functionalities. For example, motion sensor 810, light sensor 812, and proximity sensor 814 can be coupled to peripherals interface 806 to facilitate orientation, lighting, and proximity functions of the mobile device. Location processor 815 (e.g., GPS receiver) can be connected to peripherals interface 806 to provide geopositioning. Electronic magnetometer 816 (e.g., an integrated circuit chip) can also be connected to peripherals interface 806 to provide data that can be used to determine the direction of magnetic North. Thus, electronic magnetometer 816 can be used as an electronic compass. Gravimeter 817 can include a specialized accelerometer configured for measuring the local gravitational field of the Earth.

Camera subsystem 820 and an optical sensor 822, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 824, which can include radio frequency receivers and transmitters and/or optical (e.g., infrared) receivers and transmitters. The specific design and implementation of the communication subsystem 824 can depend on the communication network(s) over which a mobile device is intended to operate. For example, a mobile device can include communication subsystems 824 designed to operate over a CDMA system, a WiFi™ or WiMax™ network, and a Bluetooth™ network. In particular, the wireless communication subsystems 824 can include hosting protocols such that the mobile device can be configured as a base station for other wireless devices.

Audio subsystem 826 can be coupled to a speaker 828 and a microphone 830 to facilitate voice-enabled functions, such as voice recognition, voice replication, digital recording, and telephony functions. The audio subsystem 826 can be configured to facilitate processing voice commands, voice printing and voice authentication. In some implementations, audio recorded by the audio subsystem 826 is transmitted to an external resource for processing. For example, voice commands recorded by the audio subsystem 826 may be transmitted to a network resource such as a network server which performs voice recognition on the voice commands.

I/O subsystem 840 can include touch surface controller 842 and/or other input controller(s) 844. Touch-surface controller 842 can be coupled to a touch screen 846 or pad. Touch surface 846 and touch surface controller 842 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch surface 846.

Other input controller(s) 844 can be coupled to other input/control devices 848, such as one or more buttons, rocker switches, thumb-wheel, infrared port, USB port, and/or a pointer device such as a stylus. The one or more buttons (not shown) can include an up/down button for volume control of speaker 828 and/or microphone 830.

In one implementation, a pressing of the button for a first duration may disengage a lock of the touch surface 846; and a pressing of the button for a second duration that is longer than the first duration may turn power to the mobile device on or off. The user may be able to customize a functionality of one or more of the buttons. The touch surface 846 can, for example, also be used to implement virtual or soft buttons and/or a keyboard.

In some implementations, the mobile device can present recorded audio and/or video files, such as MP3, AAC, and MPEG files. In some implementations, the mobile device can include the functionality of an MP3 player. The mobile device may, therefore, include a pin connector that is compatible with the iPod. Other input/output and control devices can also be used.

Memory interface 802 can be coupled to memory 850. Memory 850 can include high-speed random access memory and/or non-volatile memory, such as one or more magnetic disk storage devices, one or more optical storage devices, and/or flash memory (e.g., NAND, NOR). Memory 850 can store operating system 852, such as Darwin, RTXC, LINUX, UNIX, OS X, WINDOWS, or an embedded operating system such as VxWorks. Operating system 852 may include instructions for handling basic system services and for performing hardware dependent tasks. In some implementations, operating system 852 can include a kernel (e.g., UNIX kernel).

Memory 850 may also store communication instructions 854 to facilitate communicating with one or more additional devices, one or more computers and/or one or more servers. Memory 850 may include graphical user interface instructions 856 to facilitate graphic user interface processing; sensor processing instructions 858 to facilitate sensor-related processing and functions; phone instructions 860 to facilitate phone-related processes and functions; electronic messaging instructions 862 to facilitate electronic-messaging related processes and functions; web browsing instructions 864 to facilitate web browsing-related processes and functions; media processing instructions 866 to facilitate media processing-related processes and functions; GPS/Navigation instructions 868 to facilitate GPS and navigation-related processes and instructions; camera instructions 870 to facilitate camera-related processes and functions; magnetometer data 872 and calibration instructions 874 to facilitate magnetometer calibration. The memory 850 may also store other software instructions (not shown), such as security instructions, web video instructions to facilitate web video-related processes and functions, and/or web shopping instructions to facilitate web shopping-related processes and functions. In some implementations, the media processing instructions 866 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 850. Memory 850 can include synchronizer instructions 876. Synchronizer instructions 876 can be a computer program product that is configured to cause processor 804 to perform operations of synchronizer 122 as described above in reference to FIG. 1.

Each of the above identified instructions and applications can correspond to a set of instructions for performing one or more functions described above. These instructions need not be implemented as separate software programs, procedures, or modules. Memory 850 can include additional instructions or fewer instructions. Furthermore, various functions of the mobile device may be implemented in hardware and/or in software, including in one or more signal processing and/or application specific integrated circuits.

Exemplary Operating Environment

Figure 9:
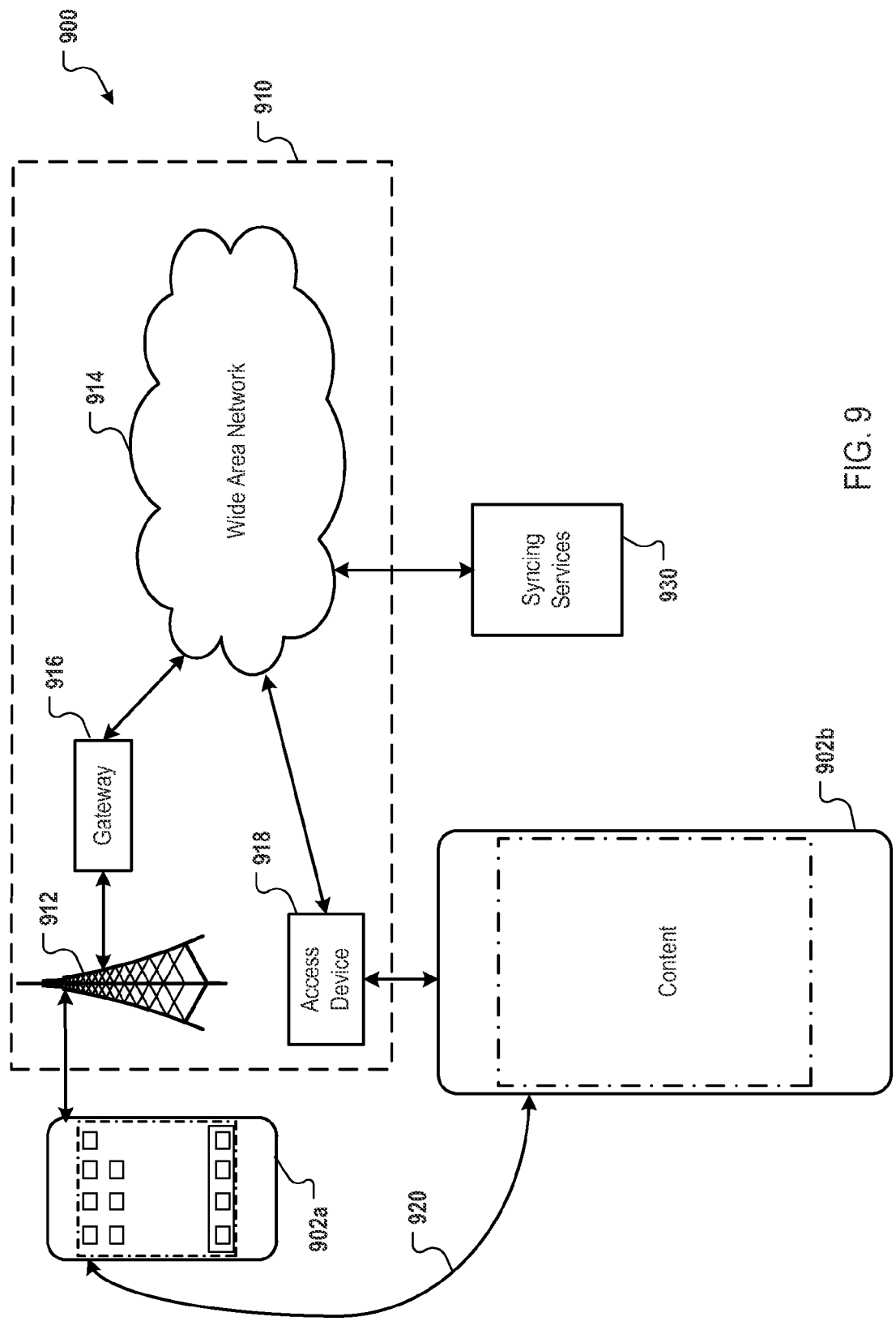
FIG. 9 is a block diagram of an exemplary network operating environment for mobile devices of FIG. 8.

FIG. 9 is a block diagram of exemplary network operating environment 900 for mobile devices of FIG. 8. Mobile devices 902a and 902b can, for example, communicate over one or more wired and/or wireless networks 910 in data communication. For example, a wireless network 912, e.g., a cellular network, can communicate with a wide area network (WAN) 914, such as the Internet, by use of a gateway 916. Likewise, an access device 918, such as an 802.11g wireless access gateway, can provide communication access to the wide area network 914.

In some implementations, both voice and data communications can be established over wireless network 912 and the access device 918. For example, mobile device 902a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 912, gateway 916, and wide area network 914 (e.g., using Transmission Control Protocol/Internet Protocol (TCP/IP) or User Datagram Protocol (UDP)). Likewise, in some implementations, the mobile device 902b can place and receive phone calls, send and receive e-mail messages, and retrieve electronic documents over the access device 918 and the wide area network 914. In some implementations, mobile device 902a or 902b can be physically connected to the access device 918 using one or more cables and the access device 918 can be a personal computer. In this configuration, mobile device 902a or 902b can be referred to as a "tethered" device.

Mobile devices 902a and 902b can also establish communications by other means. For example, wireless mobile device 902a can communicate with other wireless devices, e.g., other mobile devices 902a or 902b, cell phones, etc., over the wireless network 912. Likewise, mobile devices 902a and 902b can establish peer-to-peer communications 920, e.g., a personal area network, by use of one or more communication subsystems, such as the Bluetooth™ communication devices. Other communication protocols and topologies can also be implemented.

The mobile device 902a or 902b can, for example, communicate with one or more services 930 the one or more wired and/or wireless networks. For example, one or more synchronizing services 930 can be used to coordinate layout synchronization between mobile devices 902a and 902b.

Mobile device 902a or 902b can also access other data and content over the one or more wired and/or wireless networks. For example, content publishers, such as news sites, Rally Simple Syndication (RSS) feeds, web sites, blogs, social networking sites, developer networks, etc., can be accessed by mobile device 902a or 902b. Such access can be provided by invocation of a web browsing function or application (e.g., a browser) in response to a user touching, for example, a Web object.

A number of implementations of the invention have been described. Nevertheless, it will be understood that various modifications can be made without departing from the spirit and scope of the invention.

What is claimed is:

1. A method comprising:
receiving, by a first device, a synchronization request requesting that a local layout of the first device be synchronized with a remote layout of a second device, each layout defining a formatted view of data, the formatted views, when the local layout and remote layout are synchronized, having a consistent appearance, wherein each layout comprises a list of cells, each cell being associated with a data field and a location hint for displaying the data field at a location relative to another data field;
determining, by the first device, a difference between a property of a display device of the first device and a property of a display device of the second device;
determining, by the first device, a local cell in the local layout that corresponds to an updated remote cell in the remote layout;
updating, based on the difference between properties of display devices and based on the updated remote cell, at least one of a display size or display location of the local cell determined as corresponding to the updated remote cell, wherein the updating results in the local cell having at least one of a different display size or different display position than that of the remote cell, the difference in display size or display position compensates for the difference between the properties of the display devices and maintains a consistent appearance of the updated local cell and the updated remote cell despite the difference between the properties of the display devices; and
providing a data field for display on the first device according to the updated local cell.

2. The method of claim 1, wherein the location hint comprises a size of the cell when displayed, a display order of the cell, and a flow direction indicating the cell, the flow direction indicating that the cell, when displayed, is located at one or more of:
a beginning of a new row of cells;
a beginning of a new column of cells; or
neither a beginning of a new row nor a beginning of a new column.

3. The method of claim 1, wherein the difference between properties of the display devices comprises at least one of a difference in screen dimensions, a difference in display themes, or a difference in minimum or default font display sizes.

4. The method of claim 1, wherein determining the local cell is based on a match between an identifier of the local cell and an identifier of the remote cell, or between a location hint corresponding to the local cell and a location hint corresponding to the updated remote cell.

5. The method of claim 1, wherein determining the local cell comprises:
determining that a perfect match between a local cell and the remote cell does not exist;
creating a new local cell, including designating for the new local cell a location hint indicating that the new cell, when displayed, is located at a beginning of a new row and in a last column; and
designating the new local cell as the local cell that corresponds to the updated remote cell.

6. The method of claim 1, wherein determining the local cell comprises:
determining that a remote display order has been updated for the remote cell at the second device;
determining that a conflict exists, wherein a display order of the local cell that corresponds to the remote cell has been updated differently; and
resolving the conflict according to the display order of the local cell.

7. The method of claim 6, wherein resolving the conflict comprises:
generating, by the first device, a snapshot of the local layout, the snapshot including a list of dictionaries, each dictionary corresponding to a cell of the local layout and including a display order and a flow directions of the corresponding cell; and
providing, by the first device, the snapshot to the second device, the snapshot being associated with a conflict resolution request for the second device to update the remote layout according to the snapshot wherein the updated remote cell is further updated according to the display order of the local cell.

8. The method of claim 1, wherein updating the local cell comprises merging a local change and a remote change.

9. The method of claim 1, wherein updating the local cell comprises providing a local user input mechanism for the local cell, the local user input mechanism being different from a user input mechanism associated with the corresponding remote cell.

10. A non-transitory storage medium storing instructions operable to cause one or more processors to perform operations comprising:
receiving, by a first device, a synchronization request requesting that a local layout of the first device be synchronized with a remote layout of a second device, each layout defining a formatted view of data, the formatted views, when the local layout and remote layout are synchronized, having a consistent appearance, wherein each layout comprises a list of cells, each cell being associated with a data field and a location hint for displaying the data field at a location relative to another data field;
determining, by the first device, a difference between a property of a display device of the first device and a property of a display device of the second device;
determining, by the first device, a local cell in the local layout that corresponds to an updated remote cell in the remote layout;
updating, based on the difference between properties of display devices and based on the updated remote cell, at least one of a display size or display location of the local cell determined as corresponding to the updated remote cell, wherein the updating results in the local cell having at least one of a different display size or different display position than that of the remote cell, the difference in display size or display position compensates for the difference between the properties of the display devices and maintains a consistent appearance of the updated local cell and the updated remote cell despite the difference between the properties of the display devices; and
providing a data field for display on the first device according to the updated local cell.

11. The medium of claim 10, wherein the location hint comprises a size of the cell when displayed, a display order of the cell, and a flow direction indicating the cell, the flow direction indicating that the cell, when displayed, is located at one or more of:
a beginning of a new row of cells;
a beginning of a new column of cells; or
neither a beginning of a new row nor a beginning of a new column.

12. The medium of claim 10, wherein the difference between properties of the display devices comprises at least one of a difference in screen dimensions, a difference in display themes, or a difference in minimum or default font display sizes.

13. The medium of claim 10, wherein determining the local cell is based on a match between an identifier of the local cell and an identifier of the remote cell, or between a location hint corresponding to the local cell and a location hint corresponding to the updated remote cell.

14. The medium of claim 10, wherein determining the local cell comprises:
   determining that a perfect match between a local cell and the remote cell does not exist;
   creating a new local cell, including designating for the new local cell a location hint indicating that the new cell, when displayed, is located at a beginning of a new row and in a last column; and
   designating the new local cell as the local cell that corresponds to the updated remote cell.

15. The medium of claim 10, wherein determining the local cell comprises:
   determining that a remote display order has been updated for the remote cell at the second device;
   determining that a conflict exists, wherein a display order of the local cell that corresponds to the remote cell has been updated differently; and
   resolving the conflict according to the display order of the local cell.

16. The medium of claim 15, wherein resolving the conflict comprises:
   generating, by the first device, a snapshot of the local layout, the snapshot including a list of dictionaries, each dictionary corresponding to a cell of the local layout and including a display order and a flow directions of the corresponding cell; and
   providing, by the first device, the snapshot to the second device, the snapshot being associated with a conflict resolution request for the second device to update the remote layout according to the snapshot wherein the updated remote cell is further updated according to the display order of the local cell.

17. The medium of claim 10, wherein updating the local cell comprises merging a local change and a remote change.

18. The medium of claim 10, wherein updating the local cell comprises providing a local user input mechanism for the local cell, the local user input mechanism being different from a user input mechanism associated with the corresponding remote cell.

19. A system comprising:
   one or more processors configured to perform operations comprising:
      receiving, by a first device, a synchronization request requesting that a local layout of the first device be synchronized with a remote layout of a second device, each layout defining a formatted view of data, the formatted views, when the local layout and remote layout are synchronized, having a consistent appearance, wherein each layout comprises a list of cells, each cell being associated with a data field and a location hint for displaying the data field at a location relative to another data field;
      determining, by the first device, a difference between a property of a display device of the first device and a property of a display device of the second device;
      determining, by the first device, a local cell in the local layout that corresponds to an updated remote cell in the remote layout;
      updating, based on the difference between properties of display devices and based on the updated remote cell, at least one of a display size or display location of the local cell determined as corresponding to the updated remote cell, wherein the updating results in the local cell having at least one of a different display size or different display position than that of the remote cell, the difference in display size or display position compensates for the difference between the properties of the display devices and maintains a consistent appearance of the updated local cell and the updated remote cell despite the difference between the properties of the display devices; and
      providing a data field for display on the first device according to the updated local cell.

20. The system of claim 19, wherein the location hint comprises a size of the cell when displayed, a display order of the cell, and a flow direction indicating the cell, the flow direction indicating that the cell, when displayed, is located at one or more of:
   a beginning of a new row of cells;
   a beginning of a new column of cells; or
   neither a beginning of a new row nor a beginning of a new column.

21. The system of claim 19, wherein the difference between properties of the display devices comprises at least one of a difference in screen dimensions, a difference in display themes, or a difference in minimum or default font display sizes.

22. The system of claim 19, wherein determining the local cell is based on a match between an identifier of the local cell and an identifier of the remote cell, or between a location hint corresponding to the local cell and a location hint corresponding to the updated remote cell.

23. The system of claim 19, wherein determining the local cell comprises:
   determining that a perfect match between a local cell and the remote cell does not exist;
   creating a new local cell, including designating for the new local cell a location hint indicating that the new cell, when displayed, is located at a beginning of a new row and in a last column; and
   designating the new local cell as the local cell that corresponds to the updated remote cell.

24. The system of claim 19, wherein determining the local cell comprises:
   determining that a remote display order has been updated for the remote cell at the second device;
   determining that a conflict exists, wherein a display order of the local cell that corresponds to the remote cell has been updated differently; and
   resolving the conflict according to the display order of the local cell.

25. The system of claim 24, wherein resolving the conflict comprises:
   generating, by the first device, a snapshot of the local layout, the snapshot including a list of dictionaries, each dictionary corresponding to a cell of the local layout and including a display order and a flow directions of the corresponding cell; and
   providing, by the first device, the snapshot to the second device, the snapshot being associated with a conflict resolution request for the second device to update the remote layout according to the snapshot wherein the updated remote cell is further updated according to the display order of the local cell.

26. The system of claim 19, wherein updating the local cell comprises merging a local change and a remote change.

27. The system of claim 19, wherein updating the local cell comprises providing a local user input mechanism for the local cell, the local user input mechanism being different from a user input mechanism associated with the corresponding remote cell.

* * * * *